United States Patent
Ahola et al.

(10) Patent No.: US 9,568,921 B2
(45) Date of Patent: Feb. 14, 2017

(54) METHOD FOR APPROXIMATING A STATIC HEAD OF A FLUID TRANSFER SYSTEM

(71) Applicant: ABB Oy, Helsinki (FI)

(72) Inventors: Jero Ahola, Lappeenranta (FI); Jussi Tamminen, Lappeenranta (FI); Tero Ahonen, Lappeenranta (FI)

(73) Assignee: ABB Technology Oy, Helsinki (FI)

(*) Notice: Subject to any disclaimer, the term of this patent is extended or adjusted under 35 U.S.C. 154(b) by 545 days.

(21) Appl. No.: 14/080,337

(22) Filed: Nov. 14, 2013

(65) Prior Publication Data

US 2014/0136000 A1 May 15, 2014

(30) Foreign Application Priority Data

Nov. 15, 2012 (EP) .................................... 12192713

(51) Int. Cl.
  *G05D 16/20* (2006.01)
  *F04D 13/00* (2006.01)
  *F04D 13/06* (2006.01)
  *F04D 15/00* (2006.01)

(52) U.S. Cl.
  CPC ............. *G05D 16/20* (2013.01); *F04D 13/00* (2013.01); *F04D 13/06* (2013.01); *F04D 15/0066* (2013.01); *F04D 15/0088* (2013.01)

(58) Field of Classification Search
  CPC .................................................... G05D 16/20
  USPC ......................................................... 700/282
  See application file for complete search history.

(56) References Cited

U.S. PATENT DOCUMENTS

| 2008/0067116 A1* | 3/2008 | Anderson ............. E21B 47/042 210/100 |
| 2010/0111680 A1 | 5/2010 | Binder et al. |
| 2010/0143157 A1 | 6/2010 | Ahonen et al. |
| 2010/0150737 A1 | 6/2010 | Anderson et al. |
| 2011/0106452 A1 | 5/2011 | Anderson et al. |

(Continued)

FOREIGN PATENT DOCUMENTS

| CN | 101680456 A | 3/2010 |
| CN | 101750258 A | 6/2010 |

(Continued)

OTHER PUBLICATIONS

Carlson, "The correct Method of Calculating Energy Savings to Justify Adjustable-Frequency Drives on Pumps" IEEE Transactions on Industry Applications, vol. 36 No. 6, Nov./Dec. 2000 pp. 1725-1733.*

(Continued)

*Primary Examiner* — Mohammad Ali
*Assistant Examiner* — Emilio J Saavedra
(74) *Attorney, Agent, or Firm* — Taft Stettinius & Hollister LLP

(57) ABSTRACT

The present disclosure is directed to a method and apparatus for approximating a static head of a fluid transfer system including a fluid transfer device. The method can include determining a rotational speed and a power consumption of the fluid transfer device, determining a first set of data points, calculating a second set of data points on the basis of the first set of data points, determining a minimum rotational speed producing flow through the fluid transfer device on the basis of the second set of data points, and determining the static head on the basis of the minimum rotational speed.

19 Claims, 4 Drawing Sheets

(56) References Cited

U.S. PATENT DOCUMENTS

2012/0195770 A1    8/2012   Anderson et al.
2012/0283950 A1   11/2012   Anderson et al.

FOREIGN PATENT DOCUMENTS

| EP | 0 118 403 A1 | 9/1984 |
| --- | --- | --- |
| EP | 2 354 556 A1 | 8/2011 |
| EP | 2 610 693 A1 | 7/2013 |
| JP | 3-168386 A | 7/1991 |

OTHER PUBLICATIONS

Office Action (Notification of the First Office Action) issued on Jun. 10, 2015, by the State Intellectual Property Office of People's Republic of China in corresponding Chinese Patent Application No. 2015060501353180, with an English translation of the Office Action. (18 pages).

European Search Report, EP 12192713.1, Abb Oy, May 16, 2013, 5 pages.

\* cited by examiner

METHOD FOR APPROXIMATING A STATIC HEAD OF A FLUID TRANSFER SYSTEM

RELATED APPLICATION(S)

This application claims priority under 35 U.S.C. §119 to European Patent Application No. 12192713.1, filed on Nov. 15, 2012, the entire content of which is hereby incorporated herein by reference in its entirety.

FIELD

The disclosure relates to fluid transfer systems, for example, to determination of the system static head and the related minimum applicable rotational speed for a fluid transfer device of the fluid transfer system.

BACKGROUND DISCUSSION

Pumps, fans, and compressors can be used in industrial and municipal applications. As pump, fan, and compressor applications consume a notable amount of electrical energy, they also hold energy savings potential.

A variable which may have an effect on the savings potential in these applications is the static head of the system. The static head represents a pressure difference in the form of a vertical fluid column height which a fluid transfer device has to overcome in order to produce flow.

Information on the system static head can be used, for example, in energy audits, energy-efficiency-optimizing speed control of fluid transfer systems, and determination of rotational speed limits for the device.

The static head can be a parameter for defining a minimum possible energy consumption of a fluid transfer device, such as a pump, a fan, or a compressor. For example, a system-specific energy consumption $E_s$ (kWh/m$^3$) of a fluid transfer system can be defined as follows:

$$E_s = \frac{\rho g (H_{st} + H_{dyn})}{\eta_{dt} \eta_p} \quad (1)$$

where $\rho$ is the fluid density, g is the acceleration due to gravity, $H_{st}$ is the static head, $H_{dyn}$ is a system dynamic head caused by flow losses, $\eta_{dt}$ is the drive train efficiency, and $\eta_p$ is the device efficiency. Equation 1 shows the direct effect that $H_{st}$ can have on the system specific-energy consumption $E_s$.

Energy efficiency of a fluid transfer system operation can be improved by driving the fluid transfer device of the fluid transfer system at a selected rotational speed with the smallest possible specific energy consumption, if allowed by the surrounding process. The static head can affect the feasibility of a speed control method for a fluid transfer device, since the static head in the system curve can set a practical limit for the minimum or selected applicable rotational speed.

The static head of a fluid transfer system can be determined by additional measurements. However, for example, sensors for the additional measurements may decrease cost-effectiveness of the system.

The static head of a fluid transfer system can also be determined without additional measurements by identifying the system curve parameters with a frequency converter. This method, however, can have relatively high computational needs since it uses the least squares method for determining the system curve parameters.

SUMMARY

A method is disclosed for approximating a static head of a fluid transfer system having a fluid transfer device, the method comprising: determining a rotational speed and a power consumption of the fluid transfer device; determining a first set of data points, wherein a data point of the first set represents a power consumption at a rotational speed; calculating a second set of data points based on the first set of data points, wherein a data point of the second set represents a rate of change of the power consumption at the rotational speed of the data point of the first set; determining a selected rotational speed producing flow through the fluid transfer device based on the second set of data points; and approximating a static head based on the selected rotational speed.

An apparatus is disclosed for approximating a static head of a fluid transfer system having a fluid transfer device, wherein the apparatus comprises: a frequency converter configured to: determine a rotational speed and a power consumption of a fluid transfer device; determine a first set of data points, wherein a data point of the first set represents a power consumption at a rotational speed; and a processor configured to: calculate a second set of data points based on the first set of data points, wherein a data point of the second set represents a rate of change of the power consumption at the rotational speed of the data point of the first set; determine a selected rotational speed producing flow through a fluid transfer device on the basis of the second set of data points; and approximate a static head based on the selected rotational speed.

An apparatus is disclosed for approximating a static head of a fluid transfer system having a fluid transfer device, wherein the apparatus comprises: a frequency converter configured to: determine a rotational speed and a power consumption of a fluid transfer device; determine a first set of data points, wherein a data point of the first set represents a power consumption at a rotational speed; calculate a second set of data points based on the first set of data points, wherein a data point of the second set represents a rate of change of the power consumption at the rotational speed of the data point of the first set; determine a selected rotational speed producing flow through a fluid transfer device on the basis of the second set of data points; and approximate a static head based on the selected rotational speed.

A system is disclosed for approximating a static head of a fluid transfer system, comprising: a fluid transfer device; means for determining a rotational speed and a power consumption of the fluid transfer device, and for determining a first set of data points, wherein a data point of the first set represents a power consumption at a rotational speed; means for calculating a second set of data points based on the first set of data points, wherein a data point of the second set represents a rate of change of the power consumption at the rotational speed of the data point of the first set; and means for determining a selected rotational speed producing flow through the fluid transfer device on the basis of the second set of data points, and means for approximating a static head based on the selected rotational speed.

BRIEF DESCRIPTION OF THE DRAWINGS

In the following, exemplary embodiments will be described in greater detail by reference to the attached drawings, in which.

DETAILED DESCRIPTION

In accordance with an exemplary embodiment, a method is disclosed, which allows automatic determination of the system static head and the related minimum applicable rotational speed of a fluid transfer device in a fluid transfer system. The disclosed method can be based on an analysis of a shaft torque or a power consumption of the fluid transfer device at different rotational speeds and determination of a rotational speed at which the fluid transfer device begins to provide flow into the system.

The rotational speed at which the fluid transfer device begins to provide flow can then be used together with characteristics curves of the fluid transfer device for identifying the static head of the fluid transfer system. The disclosed method can be carried out repeatedly, for example, during a startup and/or shutdown procedure of the system.

The disclosed method can be implemented on frequency converters. If the frequency converter provides, for example, estimates of the rotational speed and the shaft torque or the power consumption of a pump, the disclosed method can be implemented without additional sensors on the pump or its motor shaft. For example, internal data loggers and calculation capacity of the frequency converters can also be utilised in gathering data during the pump startup and in the determination of the system static head. In addition, the disclosed method can have lower computational uses, which can allow a more cost-effective implementation.

In accordance with an exemplary embodiment, the static head can be a parameter for defining a minimum possible energy consumption of a fluid transfer system. Information on the system static head may also be used for determination of rotational speed limits for the device. In accordance with an exemplary embodiment, methods for approximating a static head of a fluid transfer device of a fluid transfer system and an apparatus for implementing the method are disclosed.

Figure 1:
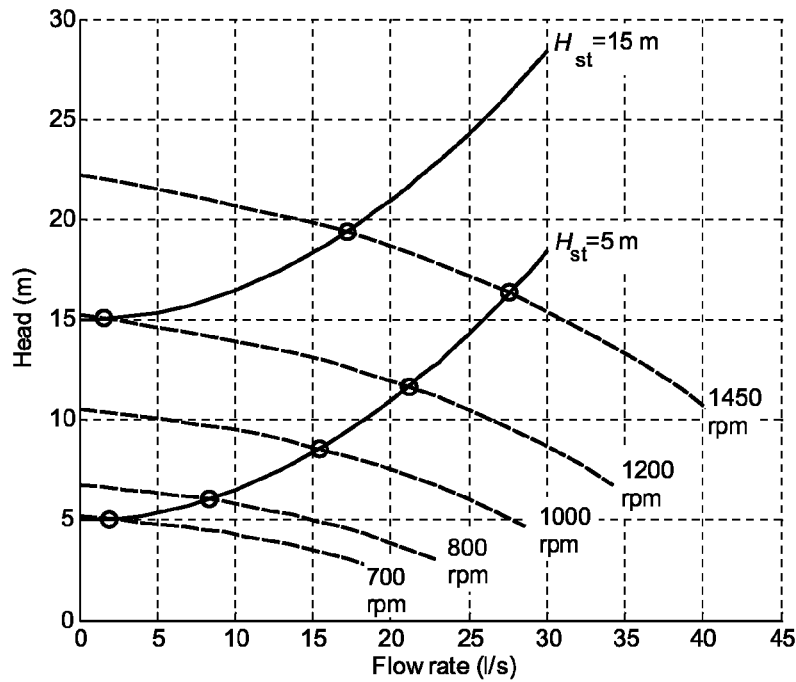
FIG. 1 illustrates an example of an effect the magnitude of static head can have on the operating point of a pump.

FIG. 1 illustrates an example of an effect the static head can have on an operating point of a fluid transfer device and on a minimum rotational speed $n_{min}$ for producing flow through the fluid transfer device. In FIG. 1, the dashed lines show QH characteristics of the fluid transfer device at different rotational speeds. The solid lines show a total system head when the static head $H_{st}$ is 5 m and 15 m.

In accordance with an exemplary embodiment, the operating point of the system can be the intersection of the present QH characteristics curve and the present total system head curve. For example, exemplary operating points are illustrated by small circles in FIG. 1.

In FIG. 1, the minimum rotational speed $n_{min}$ is approximately 700 rpm when the static head $H_{st}$ is 5 m. With the static head of 15 meters, the resulting $n_{min}$ is approximately 1200 rpm.

In accordance with an exemplary embodiment, for example, when the minimum rotational speed $n_{min}$ is known, the operation of the fluid transfer device at a harmful operating range with a higher risk for fluid recirculation and/or device stalling can be avoided.

In accordance with an exemplary embodiment, the operation of a fluid transfer device can be divided into two different regions: operation without and with produced flow. For example, when a system has a static head, the fluid transfer device can start to provide flow when a head H produced by the fluid transfer device overcomes the static head $H_{st}$ of the fluid transfer system.

In the exemplary system of FIG. 1, the rotational speed n of the fluid transfer device can be at least 700 rpm in order to overcome the static head $H_{st}$ of 5 m. At lower speeds ($n<n_{min}$), the fluid transfer device can be operating practically under the shutoff head conditions, meaning that the flow rate of the fluid transfer device remains at zero as the fluid recirculates in the fluid transfer device. In accordance with an exemplary embodiment, power consumption P of the fluid transfer device can follow the related power consumption informed in the characteristic curves of the fluid transfer device.

For example, if the power consumption of the fluid transfer device is only known at one speed, it can be approximated with a generic affinity law:

$$P_n = \left(\frac{n}{n_0}\right)^3 P_0, \quad (2)$$

where $P_0$ is a known power consumption at a known rotational speed $n_0$. These values may, for example, be published by the manufacturer of the fluid transfer device in the data sheet of the fluid transfer device.

On the basis of Equation (2), a derivative $$\frac{dP}{dn}$$

may be calculated:

$$\frac{dP}{dn} = \frac{3P_0}{n_0^3} n^2, \quad (3)$$

where the rotational speed n of the fluid transfer device can be between 0 rpm and $n_{min}$.

For example, since the power consumption of the fluid transfer device can be a product of the rotational speed n and the shaft torque T of the fluid transfer device, the shaft torque can also be used as an indicator for the power consumption. The generic affinity laws for torque and its derivative are:

$$T_n = \left(\frac{n}{n_0}\right)^2 T_0, \quad (4)$$

$$\frac{dT}{dn} = \frac{2T_0}{n_0^2} n, \quad (5)$$

where $T_0$ is a known shaft torque of the fluid transfer device at the known rotational speed $n_0$.

In accordance with an exemplary embodiment, the affinity laws are based on the Euler equation which does not consider the effect of fluid recirculation occurring especially at a flow rate of zero.

Consequently, the actual behavior of $$\frac{dP}{dn}$$

and $$\frac{dT}{dn}$$

may follow Equations (3) and (5) only approximately when the rotational speed is below $n_{min}$. However, Equations (3) and (5) can give adequate estimates of $$\frac{dP}{dn}$$

and $$\frac{dT}{dn}.$$

For example, when the rotational speed of the fluid transfer device can overcome the static head $H_{st}$, the fluid transfer device starts to produce flow. The flow rate can depend on the operating point, for example, the location of the intersection (the circles in FIG. 1) of the fluid transfer device QH characteristics curve and a total system head specification $H_{sys}$. In accordance with an exemplary embodiment, the total system head specification $H_{sys}$ can include the static head $H_{st}$ and flow-rate-dependent dynamic losses in the system (for example, the dynamic head $H_{dyn}$) that may be quantified with a friction loss factor k:

$$H_{sys} = H_{st} + H_{dyn}; \quad (6)$$

$$H_{dyn} = kQ^2 \quad (7)$$

where Q is the flow rate.

The generic affinity law for head is:

$$H_n = \left(\frac{n}{n_0}\right)^2 H_0. \quad (8)$$

When the rotational speed relationship in Equation (8) is replaced with the generic affinity law for flow rate, for example, $$\frac{n}{n_0} = \frac{Q_n}{Q_0}, \quad (9)$$

Equation (8) becomes $$H_n = \frac{H_0}{Q_0^2} Q_n^2. \quad (10)$$

Equations (7) and (10) have a similar form. For example, the affinity laws can predict the location of the operating point and the power consumption at different rotational speeds when the system head specification $H_{sys}$ only includes the dynamic head $H_{dyn}$. Compared with the zero flow rate, a non-zero flow rate can reduce the effect of the fluid recirculation phenomenon on the accuracy of the affinity laws.

However, for example, if there is a static head in the system, the system head specification as expressed in Equation (6) does not follow the generic affinity law of Equation (8). When the fluid transfer device starts to produce flow, the fluid transfer device power consumption no longer follows Equations (2) or (3) either. The dynamic head $H_{dyn}$ caused by the flow typically increases the fluid transfer device power consumption beyond the power consumption according to Equation (2) or (3).

Figure 2:
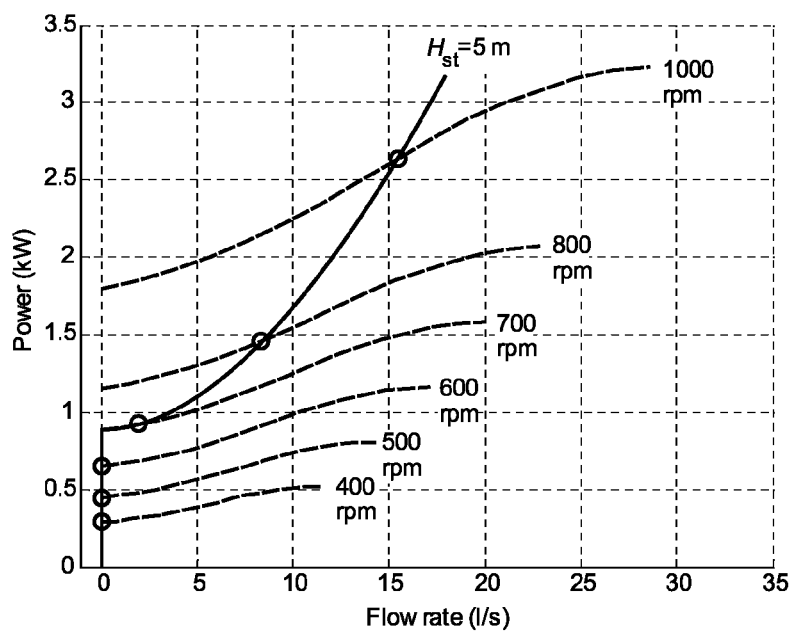
FIG. 2 illustrates an exemplary effect a flow through a pump has on the power consumption.

FIG. 2 illustrates an exemplary effect the flow rate Q has on the power consumption P. A curve of operating points at the static head of 5 meters is illustrated with a solid line. The power consumption P as a function of flow rate Q, for example, the QP characteristics, at different rotational speeds is illustrated with dashed lines. Operating points at the shown rotational speeds are marked with small circles.

In FIG. 2, the power consumption approximately follows Equations (2) or (3) when the rotational speed is below 700 rpm. However, when the rotational speed exceeds 700 rpm, the fluid transfer device starts to provide flow. The flow resulting from the rotational speed can cause an increase in the power consumption. FIG. 2 shows a steepening, increasing slope in the power consumption when following the solid line curve for operating point locations. Consequently, for example, the power consumption does not follow Equations (2) or (3) anymore.

Figure 3:
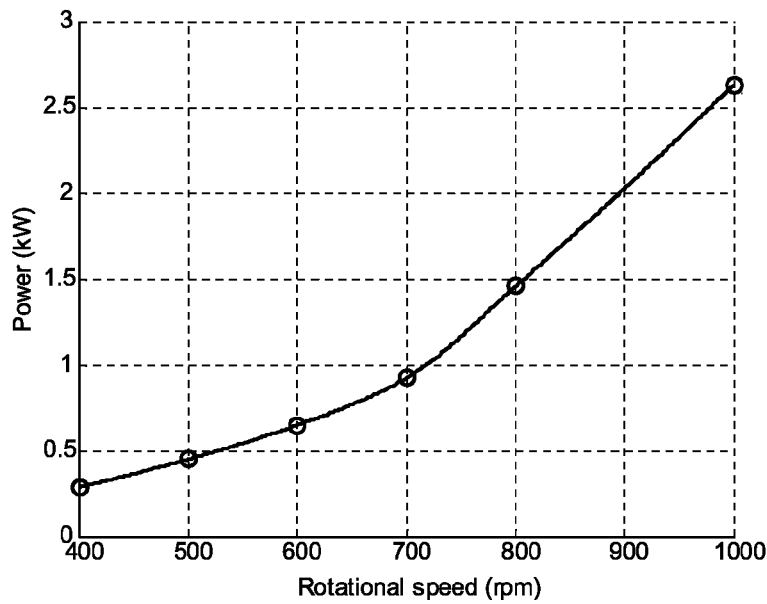
FIG. 3 illustrates pump power consumption at a selected static head level as a function of rotational speed.

In accordance with an exemplary embodiment, as a result of the increased power consumption, a change can be observed in the rate of change of the fluid transfer device power consumption as a function of rotational speed. The location of this change can be used for indicating the minimum rotational speed $n_{min}$ of the fluid transfer device. FIG. 3 illustrates the power consumption in FIG. 2 at static head level of 5 m as a function of rotational speed. In accordance with an exemplary embodiment, a visible change in the slope, for example, dP/dn, of the power consumption can be seen at 700 rpm which can be the rotational speed at which the fluid transfer device starts to produce flow.

In accordance with an exemplary embodiment, the static head can then be determined on the basis of the minimum rotational speed $n_{min}$. The static head can, for example, be determined by first determining a shutoff head at a selected speed. The shutoff head may, for example be given by the manufacturer on a data sheet of the fluid transfer device. After determining the shutoff head, the static head can be calculated on the basis of the shutoff head, the minimum rotational speed, and the affinity laws.

The shaft torque or the power consumption of the fluid transfer device can be studied during a steady state. In this manner, the shaft torque or the power consummation of the fluid transfer device may not be affected by fluid acceleration specifications or other transients. For example, this may be realized, by starting the fluid transfer device with a slow speed ramp or by increasing the rotational speed in small steps (for example 100 rpm). The previously introduced principles can also hold true during the shutdown of the fluid transfer device. For example, the system static head can be identified during the startup and/or shutdown of the fluid transfer device by using the disclosed method.

Figure 4:
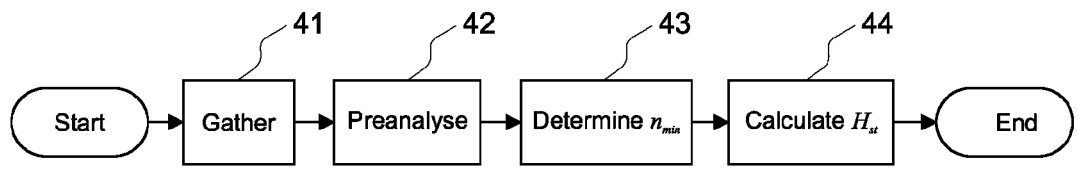
FIG. 4 illustrates a basic flow chart of an exemplary embodiment of the disclosed method.

In accordance with an exemplary embodiment, the disclosed method can be divided into four stages. FIG. 4 illustrates an exemplary flow chart of the disclosed method.

In the first stage 41, characteristics data of a fluid transfer system can be gathered. This can be accomplished, for example, by determining a rotational speed and power consumption of the fluid transfer device, and storing a first set of data points. A data point of the first set represents power consumption at a rotational speed. The characteristics data can be gathered during the startup and/or the shutdown, for example.

In the second stage 42, the gathered data can be pre-analysed. For example, a second set of data points can be calculated on the basis of the first set of data points. A data point of the second set can represent a rate of change of the power consumption at a rotational speed.

In the third stage 43, the minimum (or a selected) rotational speed producing flow through the fluid transfer device can be determined on the basis of the second set of data points.

In the fourth stage 44, the system static head $H_{st}$ can be determined on the basis of the minimum rotational speed $n_{min}$.

Figure 5:
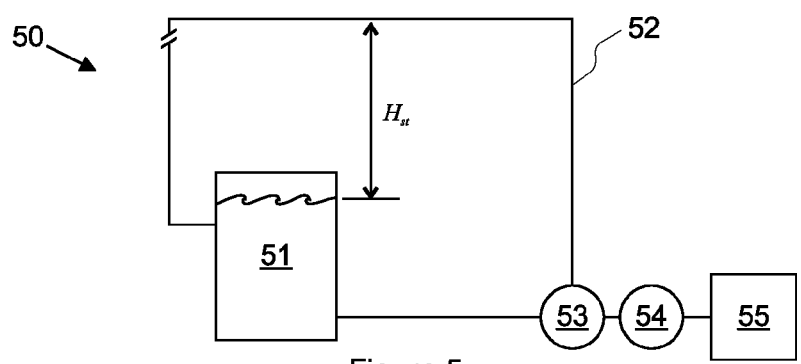
FIG. 5 illustrates an exemplary pumping system for which the disclosed method can be used.

FIG. 5 illustrates an exemplary fluid transfer system in the form of a pumping system, for which the disclosed method can be used. The pumping system 50 can include a container 51, a circulation system 52, a pump 53 connected to the circulation system 52, a motor 54 rotating the pump 53, and a frequency converter 55 powering the motor 54.

In FIG. 5, the startup and/or shutdown characteristics of the pumping system 50 can be gathered by the frequency converter 55 in the first stage of the disclosed method. In FIG. 5, the frequency converter 55 can be used for determining a rotational speed and power consumption of the pump 53 during the startup. The frequency converter 55 can, for example, estimate the rotational speed and power consumption of the pump 53. Alternatively, a torque of the pump 53 can be used as an indicator for the power consumption. On the basis of the measured rotational speed and power consumption, the frequency converter 55 can store a first set of data points, wherein a data point of the first set represents power consumption at a rotational speed.

In accordance with an exemplary embodiment, the startup may be performed out by increasing the rotational speed of the pump 53 stepwise so that the estimation of the power consumption can be carried out during the steady state after each rotational speed step. For example, a step of 50 to 100 rpm can be used in FIG. 5. In accordance with an exemplary embodiment, in order to accurately determine the minimum rotation speed $n_{min}$ from the gathered data, the stepwise increments may cover such a range that the minimum rotation speed $n_{min}$ can be assumed to fall within the range.

The startup can also be carried out by using a slow ramp that allows determination of the power consumption of the pump 53 in its steady state, and by storing the power consumption as a function of rotational speed.

Figure 6:
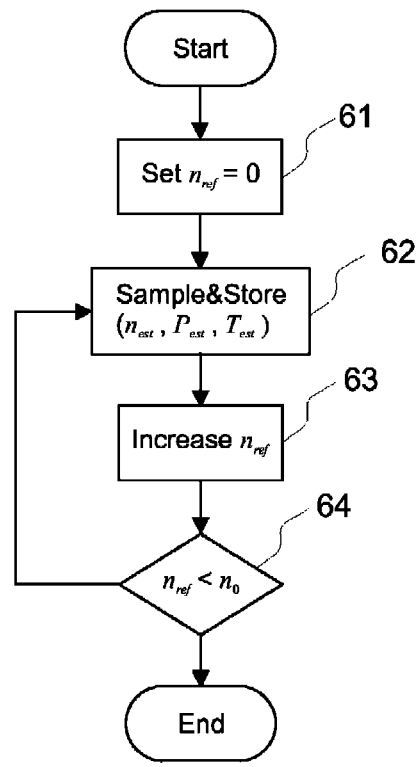
FIG. 6 illustrates an exemplary flow chart of gathering characteristics data at startup of a fluid transfer system.

FIG. 6 illustrates an exemplary flow chart of gathering characteristics data at the startup of the system in FIG. 5. In FIG. 6, the rotational speed of the pump 53 can be controlled on the basis of a speed reference $n_{ref}$.

In the first step 61, the pump 53 can be started with the speed reference $n_{ref}$ set to zero.

In the second step 62, the frequency converter 55 can estimate the rotational speed $n_{est}$ and power consumption $P_{est}$ of the pump 53. The estimates can be then stored.

Next, in the third step 63, the rotational speed reference $n_{ref}$ can be increased. The increase can be stepwise or it can be in the form of a ramp.

In the fourth step 64, the rotational speed reference $n_{ref}$ can be compared with a set limit $n_0$. The limit $n_0$ may be set such that the minimum rotation speed $n_{min}$ can be assumed to be lower that the set limit $n_0$.

For example, if the rotational speed reference $n_{ref}$ is below the set limit $n_0$, the procedure can be repeated, starting from the second step 62. If the rotational speed reference $n_{ref}$ is not below the set limit $n_0$, the procedure can be ended.

After a sufficient amount of characteristics data has been gathered in the first stage of the disclosed method, the second stage of the disclosed method may be initiated. In the second stage, the gathered data can be pre-analysed. For example, in the system of FIG. 5, the frequency converter 55 can calculate a second set of data points on the basis of the first set of data points. Each data point in the second set can represent a rate of change of the power consumption at the rotational speed of a corresponding data point in the first set.

The disclosed method can, for example, calculate a rate of change, for example, a derivate, $$\frac{dP}{dn}$$

of the power consumption. In the second set of data, the derivate $$\frac{dP}{dn}$$

can be calculated for each rotational speed of the first set. Calculating the second set of data points can include, for example, selecting a first data point $P_m$, $n_m$ and a sequentially adjacent second data point $P_{m-1}$, $n_{m-1}$ from the first set, calculating a power consumption difference $P_m - P_{m-1}$ between the power consumptions of the first and the second data point, and calculating a rotational speed difference $n_m - n_{m-1}$ between the rotational speed of the first and the second data point. The derivate $$\frac{dP}{dn}$$

can then be calculated by dividing the power consumption difference by the rotational speed difference:

$$\frac{dP}{dn} = \frac{P_m - P_{m-1}}{n_m - n_{m-1}}, \quad (11)$$

where the subscript $_m$ denotes is an index of the selected data point.

Alternatively, a rate of change $$\frac{dT}{dn}$$

of the torque can be calculated, in the similar manner as in Equation 11:

$$\frac{dT}{dn} = \frac{T_m - T_{m-1}}{n_m - n_{m-1}}. \quad (12)$$

In the system of FIG. 5, the third stage can be initiated when the characteristics data has been pre-analysed and the second set of data points has been formed. In the third stage, the minimum rotational speed $n_{min}$ producing flow through the pump 53 can be determined on the basis of the second set of data points.

For each data point in the second set, a cumulative average can be calculated of the rate of change on the basis of previous data points. The minimum rotational speed $n_{min}$ may be determined according to the $$\frac{dT}{dn}$$

of converter estimates at different rotational speeds.

In accordance with an exemplary embodiment, on the basis of the previous explanation and Equation (5), $$\frac{dT}{dn}$$

should form a direct line when the rotational speed of the pump 53 is not sufficient for producing flow. As the affinity laws may give somewhat inaccurate predictions, $$\frac{dT}{dn}$$

may even remain constant at rotational speeds below $n_{min}$. However, a change in $$\frac{dT}{dn}$$

should be notable when the pump 53 begins to produce flow.

The change in the rate of change can be detected for example, by calculating the cumulative mean (average) of $$\frac{dT}{dn}$$

and by comparing the rate of change $$\frac{dT}{dn}$$

of the each data point with the cumulative average.

If the difference between the rate of change of the each data point and the cumulative average exceeds a set limit, the rotational speed of the present data point may be used as the minimum rotational speed. For example, if an individual $$\frac{dT}{dn}$$

is twice the cumulative mean value, the respective rotational speed indicates $n_{min}$ of the pump 53.

Determination of the minimum rotational speed $n_{min}$ may also be performed on the basis of gathered pump power consumption estimates, for example, by finding a rotational speed with a notable change in $$\frac{dP}{dn}.$$

When the minimum rotational speed $n_{min}$ producing flow has been determined in the exemplary system of FIG. 5, the corresponding system static head $H_{st}$ can be calculated on the basis of the minimum rotational speed $n_{min}$ in the fourth stage of the disclosed method.

In accordance with an exemplary embodiment, the operation of the pump 53 at the minimum rotational speed $n_{min}$ can result in a pump head H that corresponds with the system static head $H_{st}$, since the produced flow rate Q is zero (or very close to it).

In the exemplary system of FIG. 5, a shutoff head $H_{so}$ at a selected rotational speed $n_0$ can be determined on the basis of a QH characteristic curve or a shutoff head (for example, the pump head at a zero flow rate) published by the manufacturer. The shutoff head $H_{so}$ can then inputted to the frequency converter 55. Then, the system static head $H_{st}$ may be calculated, for example, on the basis of the shutoff head $H_{so}$, the minimum rotational speed $n_{min}$, the selected speed $n_0$, and the affinity laws:

$$H_{st} = \left(\frac{n_{min}}{n_0}\right)^2 H_{so}. \quad (13)$$

In the exemplary system of FIG. 5, the frequency converter 55 can act as means for implementing the four stages of the disclosed method. However, implementation of the disclosed method is not restricted to implementations on the frequency converter. The frequency converter may also be used as a mere source of measurement information. For example, the disclosed method can be implemented on a separate apparatus, such as a programmable logic controller (PLC), an FPGA or a microprocessor, that has access to the estimates ($n_{est}$ and $T_{est}/P_{est}$) of the frequency converter 55 and has capability to control the operation of the pump 53. In accordance with an exemplary system of FIG. 5 can include the pump 53 as means for generating flow, but the disclosed method works correspondingly with blowers, fans, and compressors, as their operation principles and system characteristics can be quite similar to those of pumps.

Figure 7:
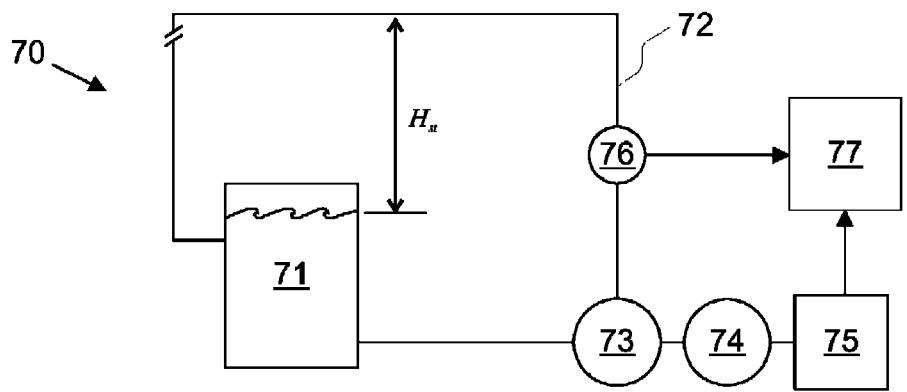
FIG. 7 illustrates an exemplary pumping system used for testing the disclosed method.

In accordance with an exemplary embodiment, the disclosed method was tested with an exemplary pumping system. FIG. 7 illustrates a schematic of the exemplary pumping system 70. The pumping system included a water container 71, a water circulation system 72, a pump 73 connected to the water circulation system 72, a motor 74 rotating the pump 73, and a frequency converter 75 powering the motor 74.

In the exemplary pumping system of FIG. 7, the water circulation system 72 produced a static head $H_{st}$ of approximately 5.6 meters during the test. In accordance with an exemplary embodiment, the accurate magnitude of the static head $H_{st}$ can be affected by the amount of water in the container 71.

The pump 73 was a Sulzer APP22-80 centrifugal pump with a shutoff head $H_{so}$ of 22 m at the rotational speed $n_0$ of 1450 rpm.

In accordance with an exemplary embodiment, the motor 74 was an ABB 11 kW induction motor, and the frequency converter 75 was an ABB ACS800 frequency converter. The frequency converter 75 can provide estimates for the pump rotational speed $n_{est}$, shaft torque $T_{est}$ and power consumption $P_{est}$.

In accordance with an exemplary embodiment, the circulation system 72 can be equipped with sensors 76 allowing measurement of the actual flow rate Q and head H of the pump 73. The measurement sensors 76 and the frequency converter 75 can be connected to a measurement computer 77, which can allow the reading and storing of the signals coming from the sensors 76 and the frequency converter 75.

In the first stage of the test, the rotational speed and the power consumption of the pump 73 were determined, and a first set of data points was gathered. Each data point in the first set represented the power consumption at a rotational speed. The pump 73 was driven at selected rotational speeds ranging from 0 to 1100 rpm. At each rotational speed, the estimates of the rotational speed, torque and power consumption produced by the frequency converter 75 were stored in the computer 77. At the same time, readings from the sensors 76 were stored in the computer 77.

Figure 8:
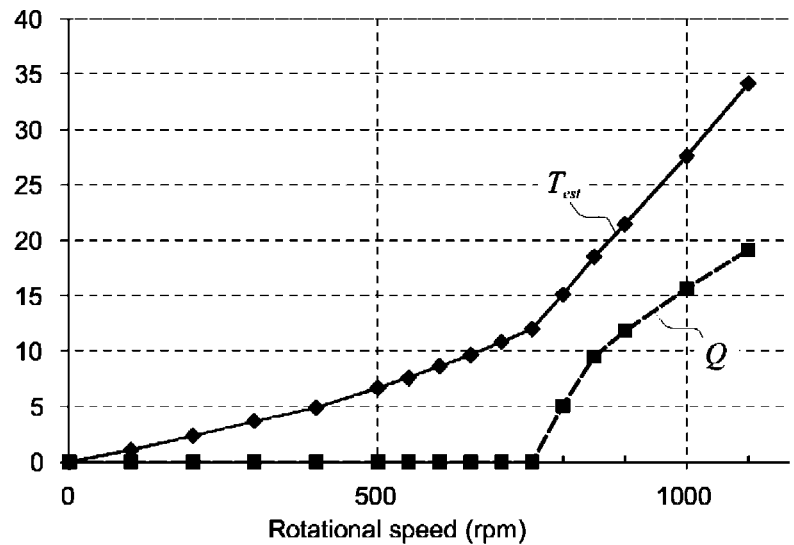
FIG. 8 illustrates shaft torque and measured actual flow rate in the system of FIG. 7 as functions of rotational speed.

In FIG. 8, the shaft torque $T_{est}$ and the measured actual flow rate Q are shown as functions of rotational speed $n_{est}$. In accordance with an exemplary embodiment, the pump 73 started to produce flow when the rotational speed $n_{est}$ was between 750 and 800 rpm. In this region, the slope of the shaft torque $T_{est}$ also became steeper.

In the second stage, a second set of data points was calculated on the basis of the first set of data points. Each data point in the second set represented a rate of change of the power consumption at the rotational speed of the data point of the first set. A rate of change $$\frac{dT}{dn}$$

of the shaft torque was calculated for each rotational speed.

In the third stage, a minimum rotational speed was determined on the basis of the second set of data points. The cumulative mean (average) of $$\frac{dT}{dn}$$

was calculated. The minimum rotational speed $n_{min}$ allowing the production of flow was then detected by comparing $$\frac{dT}{dn}$$

with its cumulative mean value.

Figure 9:
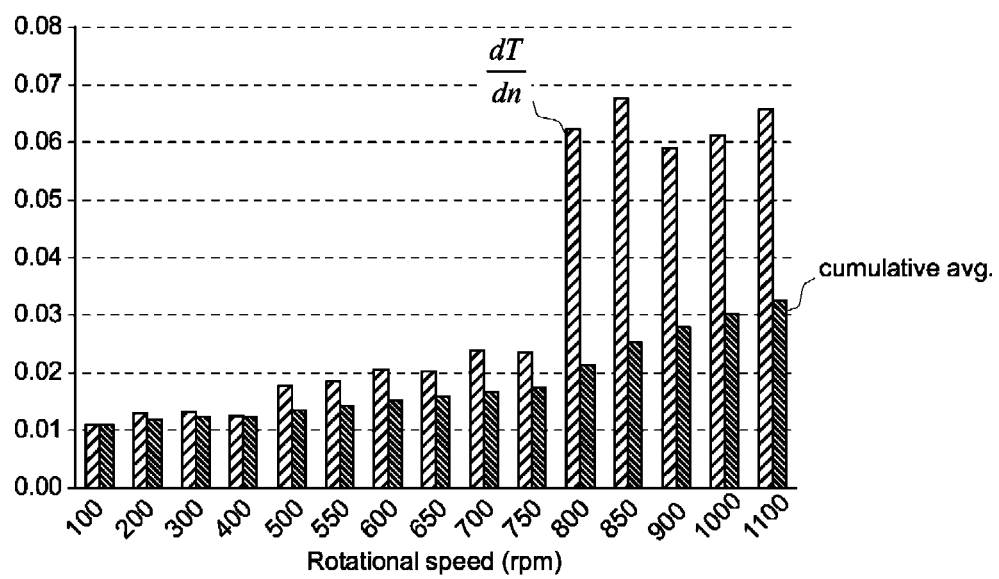
FIG. 9 illustrates a rate of change of the pump shaft torque and a cumulative mean of the rate of change as a function of rotational speed.

FIG. 9 illustrates the rate of change $$\frac{dT}{dn}$$

of the pump shaft torque and the cumulative mean of the rate of change $$\frac{dT}{dn}$$

as a function of rotational speed $n_{est}$. FIG. 9 shows that there was an increase in $$\frac{dT}{dn}$$

compared to its cumulative mean (average) when the pump started to produce flow. In accordance with an exemplary embodiment, $n_{min}$ was estimated to be between about 750 and 800 rpm.

In the final, fourth step of the test, the static head $H_{st}$ was determined on the basis of the minimum rotational speed. Based on the known shutoff head $H_{so}$ at 1450 rpm and Equation (13), the estimated system static head was approximated to be between 5.9 and 6.7 meters.

In accordance with an exemplary embodiment, the estimation accuracy of the $H_{st}$ can be affected, among others, by the accuracy of shutoff head $H_{so}$ information for the pump 73 and the speed interval used in gathering the startup or shutdown characteristics.

Although there was a difference between the actual (5.6 m) and estimated (5.9-6.7 m) static head $H_{st}$, the disclosed method can provide a result for the static head and the related minimum applicable rotational speed $n_{min}$.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A method for approximating a static head of a fluid transfer system having a fluid transfer device, the method comprising:
   determining a rotational speed and a power consumption of the fluid transfer device;
   determining a first set of data points, wherein a data point of the first set represents a power consumption at a rotational speed;
   calculating a second set of data points based on the first set of data points, wherein a data point of the second set represents a rate of change of the power consumption at the rotational speed of the data point of the first set, wherein the rate of change of the power consumption is a function of the rotational speed;
   determining a selected rotational speed producing flow through the fluid transfer device based on the second set of data points; and
   approximating a static head based on the selected rotational speed, wherein determining the selected rotational speed comprises:
for each data point in the second set:
calculating a cumulative average of a rate of change on the basis of previous data points;
comparing the rate of change of each data point with the cumulative average; and
if a difference between the rate of change of each data point and the cumulative average exceeds a set limit, using the rotational speed of each data point as the selected rotational speed.

2. The method as claimed in claim 1, comprising:
using a torque of the fluid transfer device as an indicator for the power consumption.

3. The method as claimed in claim 1, wherein calculating the second set of data points comprises:
selecting a first data point and a sequentially adjacent second data point from the first set;
calculating a power consumption difference between the power consumption of the first and the second data point;
calculating a rotational speed difference between the rotational speed of the first and the second data points; and
dividing the power consumption difference by the rotational speed difference.

4. The method as claimed in claim 1, wherein approximating the static head comprises:
determining a shutoff head at a selected shutoff rotational speed; and
calculating the static head on the basis of the shutoff head, the selected rotational speed, the selected shutoff rotational speed, and affinity laws.

5. The method as claimed in claim 4, wherein calculating the static head comprising:
multiplying the shutoff head by a square of a ratio between the selected rotational speed and the selected shutoff rotational speed.

6. The method as claimed in claim 1, wherein the selected rotational speed is a minimum rotational speed producing flow through the fluid transfer device.

7. An apparatus for approximating a static head of a fluid transfer system having a fluid transfer device, wherein the apparatus comprises:
a frequency converter configured to:
determine a rotational speed and a power consumption of a fluid transfer device;
determine a first set of data points, wherein a data point of the first set represents a power consumption at a rotational speed; and
a processor configured to:
calculate a second set of data points based on the first set of data points, wherein a data point of the second set represents a rate of change of the power consumption at the rotational speed of the data point of the first set, wherein the rate of change of the power consumption is a function of the rotational speed;
determine a selected rotational speed producing flow through a fluid transfer device on the basis of the second set of data points; and
approximate a static head based on the selected rotational speed;
wherein the processor is configured to determine the selected rotational speed by:
for each data point in the second set:
calculating a cumulative average of a rate of change on the basis of previous data points;
comparing the rate of change of each data point with the cumulative average; and
if a difference between the rate of change of each data point and the cumulative average exceeds a set limit, using the rotational speed of each data point as the selected rotational speed.

8. The apparatus as claimed in claim 7, wherein the frequency converter is configured to:
determine a torque of the fluid transfer device as an indicator for the power consumption.

9. The apparatus as claimed in claim 7, wherein the processor is configured to calculate the second set of data points by:
selecting a first data point and a sequentially adjacent second data point from the first set;
calculating a power consumption difference between the power consumption of the first and the second data point;
calculating a rotational speed difference between the rotational speed of the first and the second data point; and
dividing the power consumption difference by the rotational speed difference.

10. The apparatus as claimed in claim 7, wherein the processor is configured to approximate the static head by:
determining a shutoff head at a selected shutoff rotational speed; and
calculating the static head on the basis of the shutoff head, the selected rotational speed, the selected shutoff rotational speed, and affinity laws.

11. The apparatus as claimed in claim 10, wherein the processor is configured to calculate the static head by:
multiplying the shutoff head by a square of a ratio between the selected rotational speed and the selected shutoff rotational speed.

12. The apparatus as claimed in claim 7, wherein the selected rotational speed is a minimum rotational speed producing flow through a fluid transfer device.

13. The apparatus as claimed in claim 7, in combination with:
the fluid transfer device configured as a pump having a motor for rotating the pump.

14. The apparatus as claimed in claim 13, in combination with a water container and a water circulation system.

15. The apparatus as claimed in claim 13, wherein the frequency converter is configured to power the motor of the pump.

16. An apparatus for approximating a static head of a fluid transfer system having a fluid transfer device, wherein the apparatus comprises:
a frequency converter configured to:
determine a rotational speed and a power consumption of a fluid transfer device;
determine a first set of data points, wherein a data point of the first set represents a power consumption at a rotational speed;
calculate a second set of data points based on the first set of data points, wherein a data point of the second set represents a rate of change of the power consumption at the rotational speed of the data point of the first set, wherein the rate of change of the power consumption is a function of the rotational speed;
determine a selected rotational speed producing flow through a fluid transfer device on the basis of the second set of data points; and
approximate a static head based on the selected rotational speed;

wherein the frequency converter is configured to determine the selected rotational speed by:
for each data point in the second set:
calculating a cumulative average of a rate of change on the basis of previous data points;
comparing the rate of change of each data point with the cumulative average; and
if a difference between the rate of change of each data point and the cumulative average exceeds a set limit, using the rotational speed of each data point as the selected rotational speed.

17. The apparatus as claimed in claim 16, wherein the frequency converter is configured to:
determine a torque of the fluid transfer device as an indicator for the power consumption; and
calculate the second set of data points by:
selecting a first data point and a sequentially adjacent second data point from the first set;
calculating a power consumption difference between the power consumption of the first and the second data point;
calculating a rotational speed difference between the rotational speed of the first and the second data point; and
dividing the power consumption difference by the rotational speed difference.

18. The apparatus as claimed in claim 16, wherein the frequency converter comprises:
a processor.

19. A system for approximating a static head of a fluid transfer system, comprising:

a fluid transfer device;
means for determining a rotational speed and a power consumption of the fluid transfer device, and for determining a first set of data points, wherein a data point of the first set represents a power consumption at a rotational speed;
means for calculating a second set of data points based on the first set of data points, wherein a data point of the second set represents a rate of change of the power consumption at the rotational speed of the data point of the first set, wherein the rate of change of the power consumption is a function of the rotational speed; and
means for determining a selected rotational speed producing flow through the fluid transfer device on the basis of the second set of data points, and
means for approximating a static head based on the selected rotational speed;
wherein determining the selected rotational speed comprises:
for each data point in the second set:
calculating a cumulative average of a rate of change on the basis of previous data points;
comparing the rate of change of each data point with the cumulative average; and
if a difference between the rate of change of each data point and the cumulative average exceeds a set limit, using the rotational speed of each data point as the selected rotational speed.

* * * * *